(12) United States Patent
Kim et al.

(10) Patent No.: US 9,209,491 B2
(45) Date of Patent: Dec. 8, 2015

(54) STACK/FOLDING-TYPED ELECTRODE ASSEMBLY AND METHOD FOR PREPARATION OF THE SAME

(75) Inventors: KiJae Kim, Seoul (KR); Min Su Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1168 days.

(21) Appl. No.: 12/747,671

(22) PCT Filed: Dec. 12, 2008

(86) PCT No.: PCT/KR2008/007396
§ 371 (c)(1),
(2), (4) Date: Nov. 12, 2010

(87) PCT Pub. No.: WO2009/078632
PCT Pub. Date: Jun. 25, 2009

(65) Prior Publication Data
US 2011/0052964 A1    Mar. 3, 2011

(30) Foreign Application Priority Data
Dec. 14, 2007    (KR) .................. 10-2007-0131576

(51) Int. Cl.
| | |
|---|---|
| H01M 2/20 | (2006.01) |
| H01M 10/0583 | (2010.01) |
| H01M 2/16 | (2006.01) |
| H01M 2/18 | (2006.01) |
| H01M 10/04 | (2006.01) |
| H01M 10/0525 | (2010.01) |

(52) U.S. Cl.
CPC ........ *H01M 10/0583* (2013.01); *H01M 2/1673* (2013.01); *H01M 2/18* (2013.01); *H01M 10/0459* (2013.01); *H01M 10/0525* (2013.01); *H01M 2/1653* (2013.01); *Y02E 60/122* (2013.01); *Y02T 10/7011* (2013.01); *Y10T 29/49108* (2015.01)

(58) Field of Classification Search
None
See application file for complete search history.

(56) References Cited

U.S. PATENT DOCUMENTS

| | | | |
|---|---|---|---|
| 4,164,068 A | 8/1979 | Shropshire et al. | |
| 5,300,373 A | 4/1994 | Shackle | |
| 6,063,519 A | 5/2000 | Barker et al. | |
| 6,632,562 B1 * | 10/2003 | Nakatsuka et al. | 429/158 |
| 2002/0160257 A1 * | 10/2002 | Lee et al. | 429/130 |
| 2007/0184350 A1 | 8/2007 | Kim et al. | |

FOREIGN PATENT DOCUMENTS

| | | |
|---|---|---|
| CN | 1363121 A | 8/2002 |
| JP | 2007-317638 A | 12/2007 |

(Continued)

*Primary Examiner* — Patrick Ryan
*Assistant Examiner* — Christopher Domone
(74) *Attorney, Agent, or Firm* — Birch, Stewart, Kolasch & Birch, LLP

(57) ABSTRACT

Disclosed herein is an electrode assembly constructed in a structure in which a plurality of electrochemical cells, formed of full cells having a cathode/separator/anode structure, as basic units, are overlapped, and a continuous separator sheet is disposed between the overlapped electrochemical cells, wherein a unit electrode surrounded by the separator sheet is located at a middle of the overlapped electrochemical cells, which is a winding start point, and the full cells disposed above and below the unit electrode are symmetrical to each other about the unit electrode in the direction of electrodes of the full cells. The electrode assembly is manufactured with high productivity while the electrode assembly exhibits performance and safety equal to those of a conventional stack/folding type electrode assembly.

12 Claims, 9 Drawing Sheets

(56) References Cited

FOREIGN PATENT DOCUMENTS

| KR | 2002-0066599 A | 8/2002 |
| KR | 10-0894410 B1 | 4/2009 |
| WO | WO 03/100901 A1 | 12/2003 |
| WO | WO03100901 * | 12/2003 |
| WO | 2007/132992 A1 | 11/2007 |
| WO | 2009/005288 A1 | 1/2009 |

* cited by examiner

FIG. 3
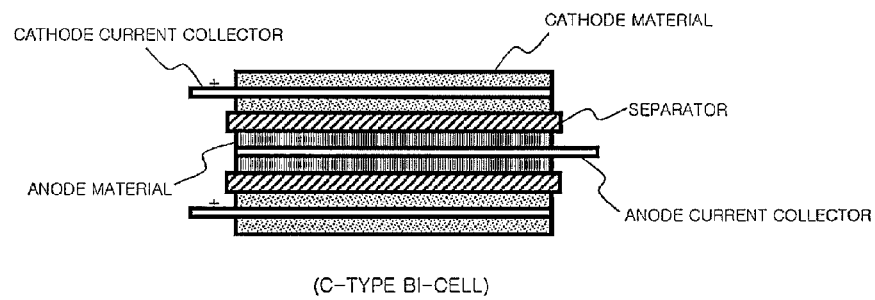
(C-TYPE BI-CELL)
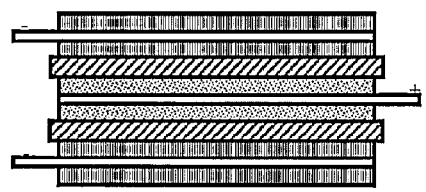
(A-TYPE BI-CELL)
FIG. 4
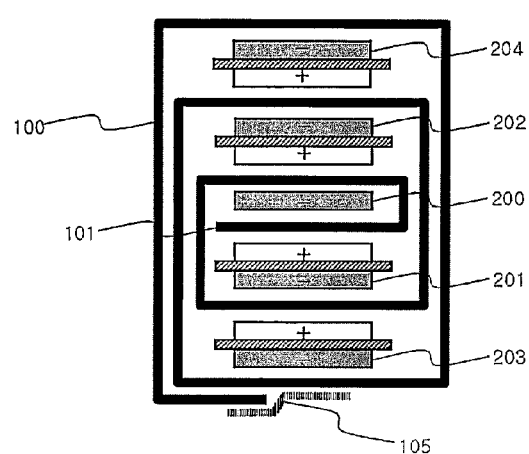

STACK/FOLDING-TYPED ELECTRODE ASSEMBLY AND METHOD FOR PREPARATION OF THE SAME

FIELD OF THE INVENTION

The present invention relates to a method of manufacturing a stack/folding type electrode assembly and a method of manufacturing the same, and, more particularly, to an electrode assembly constructed in a structure in which a plurality of electrochemical cells, formed of full cells having a cathode/separator/anode structure, as basic units, are overlapped, and a continuous separator sheet is disposed between the overlapped electrochemical cells, wherein a unit electrode surrounded by the separator sheet is located at a middle of the overlapped electrochemical cells, which is a winding start point, and the full cells disposed above and below the unit electrode are symmetrical to each other about the unit electrode in the direction of electrodes of the full cells.

BACKGROUND OF THE INVENTION

As mobile devices have been increasingly developed, and the demand for such mobile devices has increased, the demand for batteries has also sharply increased as an energy source for the mobile devices. Accordingly, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, having high energy density, high discharge voltage, and high power stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and long-sheet type anodes are wound while separators are disposed respectively between the cathodes and the anodes or in a stack type structure in which pluralities of cathodes and anodes having a predetermined size are successively stacked while separators are disposed respectively between the cathodes and the anodes.

However, the conventional electrode assemblies have several problems.

First, the jelly-roll type electrode assembly is manufactured by densely winding the long-sheet type cathodes and the long-sheet type anodes with the result that the jelly-roll type electrode assembly is circular or elliptical in section. Consequently, stress, caused by the expansion and contraction of the electrodes during the charge and discharge of a battery, accumulates in the electrode assembly, and, when the stress accumulation exceeds a specific limit, the electrode assembly may be deformed. The deformation of the electrode assembly results in the nonuniform gap between the electrodes. As a result, the performance of the battery is abruptly deteriorated, and the safety of the battery is not secured due to an internal short circuit of the battery. Furthermore, it is difficult to rapidly wind the long-sheet type cathodes and the long-sheet type anodes while maintaining uniformly the gap between the cathodes and anodes, with the result that the productivity is lowered.

Secondly, the stack type electrode assembly is manufactured by sequentially stacking the plurality of unit cathodes and the plurality of unit anodes. As a result, it is additionally necessary to provide a process for transferring electrode plates, which are used to manufacture the unit cathodes and the unit anodes. Furthermore, a great deal of time and effort are required to perform the sequential stacking process, with the result that the productivity is lowered.

In order to solve the above-mentioned problems, there has been developed a stack/folding type electrode assembly, which is a combination of the jelly-roll type electrode assembly and the stack type electrode assembly. The stack/folding type electrode assembly is constructed in a structure in which pluralities of cathodes and anodes having a predetermined size are successively stacked, while separators are disposed respectively between the cathodes and the anodes, to constitute a bi-cell or a full-cell, and then a plurality of bi-cells or a plurality of full-cells are wound while the bi-cells or the full cells are located on a long separator sheet. The details of the stack/folding type electrode assembly are disclosed in Korean Patent Application Publication No. 2001-0082058, No. 2001-0082059, and No. 2001-0082060, which have been filed in the name of the applicant of the present patent application.

FIGS. 1 and 2 typically illustrate an exemplary structure of such a stack/folding type electrode assembly and a process for manufacturing the stack/folding type electrode assembly, respectively.

Referring to these drawings, a plurality of full cells 10, 11, 12, 13, 14 . . ., as unit cells, constructed in a structure in which a cathode, a separator, and an anode are sequentially arranged are overlapped such that a separator sheet 20 is disposed between the respective full cells. The separator sheet 20 has unit lengths sufficient to surround the respective full cells. The separator sheet 20 is bent inward every unit length to successively surround the respective full cells from the central full cell 10 to the outermost full cell 14 such that the separator sheet 20 is disposed between the overlapped full cells. The outer end of the separator sheet 20 is finished by thermal welding or an adhesive tape 25.

The stack/folding type electrode assembly is manufactured, for example, by arranging the full cells 10, 11, 12, 13, 14 . . . on the long separator sheet 20 and sequentially winding the full cells 10, 11, 12, 13, 14 . . . from one end 21 of the separator sheet 20.

When carefully observing the array combination of the full cells as the unit cells, the first full cell 10 and the second full cell 11 are spaced from each other by a distance equivalent to the width corresponding to at least one full cell. Consequently, during the winding process, the outside of the first full cell 10 is completely surrounded by the separator sheet 20, and then a bottom electrode of the first full cell 10 faces a top electrode of the second full cell 11.

During the sequential stacking of the second full cell and the following full cells 11, 12, 13, 14 . . . through the winding, the surrounding length of the separator sheet 20 increases, and therefore, the full cells are arranged such that the distance between the full cells gradually increases in the winding direction.

Also, during the winding of the full cells, it is required for cathodes of the full cells to face anodes of the corresponding full cells at the interfaces between the respective full cells. Consequently, the first full cell 10 and the second full cell 11 are full cells of which the top electrode is a cathode, the third full cell 12 is a full cell of which the top electrode is an anode, the fourth full cell 13 is a full cell of which the top electrode is a cathode, and the fifth full cell 14 is a full cell of which the top electrode is an anode. That is, except the first full cell 10, the full cells of which the top electrode is a cathode and the full cells of which the top electrode is an anode are alternately arranged.

Consequently, the stack/folding type electrode assembly considerably makes up for the defects of the jelly-roll type electrode assembly and the stack type electrode assembly. In order to stack the bi-cells or the full cells, which are the unit cells, such that the bi-cells or the full cells have opposite electrodes at the interfaces between the unit cells, however, it is required to sort the bi-cells or the full cells based on the type of the bi-cells or the full cells and load the bi-cells or the full cells on the separator sheet according to a predetermined rule, with the result that the manufacturing process is complicated and troublesome, and therefore, the productivity is lowered. Furthermore, it is very complicated and troublesome to sort the unit cells based on the type of the unit cells. Consequently, when even any one of the unit cells is omitted or wrongly located due to various causes, such as carelessness or errors, during loading the unit cells on the separator sheet, electrodes having the same polarity face each other at the interfaces between the unit cells, with the result that the performance of the battery is deteriorated.

In conclusion, the stack/folding type electrode assembly is preferred in the aspect of the operational performance and safety of the battery. However, the stack/folding type electrode assembly is disadvantageous as described above in the aspect of the productivity of the battery. Consequently, there is a high necessity for an electrode assembly that is capable of providing higher productivity and operational performance of the battery while making up for the above-mentioned defects.

In particular, a large number of battery cells (unit cells) are necessary to manufacture a large-sized battery module, used for middle- or large-sized devices, such as electric vehicles and hybrid electric vehicles, in which much interest has been taken in recent years. Also, the large-sized battery module requires a long-term life span property. Consequently, there is a high necessity for an electrode assembly having a specific structure to solve all the above-mentioned problems.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present application have developed an electrode assembly constructed in a structure in which full cells are used as unit cells, and a separator sheet is disposed between overlapped unit cells, wherein an unit electrode surrounded by the separator sheet is located at the middle of the overlapped unit cells, which is a winding start point, and have found that, the electrode assembly with the above-stated construction can be manufactured with high productivity while the electrode assembly exhibits performance and safety equal to those of the conventional stack/folding type electrode assembly, and, furthermore, the electrode assembly according to the present invention exhibits excellent operational performance and safety even after the long-term use thereof. The present invention has been completed based on these findings.

In accordance with one aspect of the present invention, the above and other objects can be accomplished by the provision of an electrode assembly constructed in a structure in which a plurality of electrochemical cells, formed of full cells having a cathode/separator/anode structure, as basic units, are overlapped, and a continuous separator sheet is disposed between the overlapped electrochemical cells, wherein a unit electrode surrounded by the separator sheet is located at the middle of the overlapped electrochemical cells, which is a winding start point, and the full cells disposed above and below the unit electrode are symmetrical to each other about the unit electrode in the direction of electrodes of the full cells.

According to circumstances, i) a bi-cell ('A-type bi-cell'), having a cathode/separator/anode/separator/cathode structure, surrounded by the separator sheet, or ii) a bi-cell ('C-type bi-cell'), having an anode/separator/cathode/separator/anode structure, surrounded by the separator sheet, may be located at the middle of the overlapped electrochemical cells, which is the winding start point, and the full cells disposed above and below the bi-cell may be symmetrical to each other about the bi-cell in the direction of electrodes of the full cells.

The electrode assembly with the above-stated construction is a stack/folding type electrode assembly that is capable of efficiently using a space. In particular, it is possible to maximize the contents of electrode active materials, thereby implementing a highly integrated battery. Furthermore, it is not necessary to arrange the unit cells such that the electrodes of the unit cells are arranged in alternating orientations by predetermined units of the unit cells, but it is possible to arrange all the unit cells on the separator sheet, such that the unit cells have the same electrode orientation, and winding the unit cells, thereby simplifying the manufacturing process and thus greatly improving the production efficiency.

In an exemplary example, the separator sheet may have unit lengths sufficient to surround the respective electrochemical cells, and the separator sheet may be bent inward every unit length to successively surround the unit electrode or the central bi-cell and the full cells from the central unit electrode or the central bi-cell to the outermost full cell. In the conventional art, when the interface contact between the electrodes and the separator sheet is not maintained due to the repetitive charge and discharge of the battery, the capacity and performance of the battery are rapidly deteriorated. Consequently, pressure is required to stably press the interface such that the interface contact can be continuously maintained. In the electrode assembly with the above-stated construction, when the full cells are stacked, the separator sheet is disposed between the respective full cells, with the result that it is possible to efficiently use the electrodes between the full cells. Also, the pressure generated when winding the separator sheet can press all the interfaces between the electrodes of the cells and the separator sheet, and therefore, the electrode assembly according to the present invention is very excellent in the aspect of the performance and capacity of the battery.

In the present invention, the unit electrode or the bi-cell is located at the middle of the overlapped electrochemical cells, which is the winding start point, and the remaining basic units are the full cells.

The unit electrode means an electrode of a cathode or anode structure.

The bi-cell means a unit cell constructed in a structure in which the same electrodes are located at opposite sides thereof, such as a cathode/separator/anode/separator/cathode structure or an anode/separator/cathode/separator/anode structure. A representative example of the bi-cell is illustrated in FIG. 3. In this specification, the cell of the cathode/separator/anode/separator/cathode structure, i.e., the cell constructed in a structure in which the cathodes are located at opposite sides thereof, is referred to as an 'A-type bi-cell,' and the cell of the anode/separator/cathode/separator/anode structure, i.e., the cell constructed in a structure in which the anodes are located at opposite sides thereof, is referred to as a 'C-type bi-cell.' The number of the cathodes, the anodes, and the separators constituting the bi-cell is not particularly restricted as long as the electrodes located at the opposite sides of the cell have the same polarity.

The full cell, as the basic unit, is not particularly restricted as long as the full cell is constructed in a structure in which the top electrode and the bottom electrode of the full cell have different polarities. For example, the full cell may be constructed in i) a cathode/separator/anode stack structure or ii) a cathode/separator/anode/separator/cathode/separator/anode stack structure. The number of full cells wound while the full cells are located on the separator sheet may be decided based on various factors, such as the structures of the respective full cells, required capacity of a finally manufactured battery, etc. Preferably, the number of the full cells is 6 to 30.

Meanwhile, the electrode assembly is constructed such that the anodes occupy as large an area as possible, when the plurality of full cells are stacked in a structure in which the cathodes of the full cells face the anodes of the corresponding full cells. Consequently, for example, for a lithium secondary battery, it is possible to maximally retrain the dendritic growth of lithium metal at the anodes during the charge and discharge of the battery.

To this end, in an exemplary example, the unit electrode located at the middle of the overlapped electrochemical cells, which is the winding start point, may be an anode. On the other hand, the bi-cell located at the middle of the overlapped electrochemical cells, which is the winding start point, may be a C-type bi-cell.

In another exemplary example, the electrode assembly may be constructed such that anodes are located at the topmost layer and the bottommost layer of the electrode assembly forming the outer surface of the electrode assembly. For example, when a cathode or an A-type bi-cell is located at the middle of the overlapped electrochemical cells, which is the winding start point, C-type bi-cells may be located at the topmost layer and the bottommost layer of the electrode assembly forming the outer surface of the electrode assembly.

When the full cells are wound while being located on the long separator sheet, the separator sheet is disposed between the overlapped full cells. Consequently, it is required for the respective full cells to be stacked such that the cathodes and the corresponding anodes face each other while the separator sheet is disposed between the respective full cells.

The separator sheet may have a length extended to surround the electrode assembly once after the winding, and the outermost end of the separator sheet may be fixed by thermal welding or an adhesive tape. For example, a thermal welding device or a heat plate may be brought into contact with the separator sheet to be finished such that the separator sheet itself is welded by heat and then fixed. Consequently, the pressure is continuously maintained, and therefore, stable interface contact between the electrode and the separator sheet is achieved.

The materials for the separator sheet or the separator disposed between the cathode and the anode of the cell are not particularly restricted so long as the separator sheet and the separator exhibit high insulation and are constructed in a porous structure in which the movement of ions is possible. The separator sheet and the separator may be made of the same material or different materials.

As the separator sheet or the separator, for example, an insulative thin film having high ion permeability and high mechanical strength may be used. The separator sheet or the separator typically has a pore diameter of 0.01 to 10 µm and a thickness of 5 to 300 µm. As the material for the separator sheet or the separator, for example, sheets or non-woven fabrics made of an olefin polymer, such as polypropylene, which has chemical resistance and hydrophobicity, glass fibers, or polyethylene, are used. When a solid electrolyte, such as a polymer, is employed as the electrolyte, the solid electrolyte may also serve as both the separator and the electrolyte. Preferably, the separator sheet or the separator is made of polyethylene film, polypropylene film, multi-layered film manufactured by a combination of the polyethylene film and the polypropylene film, or polymer film for a polymer electrolyte or a gel-type polymer electrolyte, such as polyvinylidene fluoride, polyethylene oxide, polyacrylonitrile, or polyvinylidene fluoride hexafluoropropylene copolymer.

The separator preferably has an adhesive function by thermal welding to constitute a full cell or a bi-cell. On the other hand, the separator sheet does not necessarily have such an adhesive function; however, it is preferred for the separator sheet to have the adhesive function to easily perform the winding process. In a exemplary example, the separator sheet and/or the separator may be made of polymer film for a polymer electrolyte, having an adhesive function by thermal welding, which includes a first polymer layer of micro porosity and a second polymer layer obtained by gelling polyvinylidene fluoride chlorotrifluoroethylene copolymer, disclosed in Korean Patent Application No. 1999-57312 filed in the name of the applicant of the present application. The disclosure of the application is incorporated herein by reference.

Each unit electrode is classified into a cathode or an anode. Each full cell or each bi-cell is manufactured by coupling the cathode and the anode to each other while interposing a separator between the cathode and the anode. Each cathode is manufactured, for example, by applying, drying, and pressing a mixture of a cathode active material, a conducting agent, and a binder to a cathode current collector. According to circumstances, a filler may be added to the mixture.

Generally, the cathode current collector has a thickness of 3 to 500 µm. The cathode current collector is not particularly restricted as long as the cathode current collector has high conductivity while the cathode current collector does not induce any chemical change in the battery concerned. For example, the cathode current collector may be made of stainless steel, aluminum, nickel, titanium, or plastic carbon. Alternatively, the cathode current collector may be made of aluminum or stainless steel the surface of which is treated with carbon, nickel, titanium, or silver. The cathode current collector may have micro concavo-convex parts formed at the surface thereof so as to increase the attaching force of the cathode active material. The cathode current collector may be constructed in various forms, such as a film, a sheet, a foil, a net, a porous body, a foam body, and a non-woven fabric body.

For a lithium secondary battery, the cathode active material may be, but is not limited to, a layered compound, such as lithium cobalt oxide ($LiCoO_2$) or lithium nickel oxide ($LiNiO_2$), or a compound replaced by one or more transition metals; lithium manganese oxide represented by a chemical formula $Li_{1+x}Mn_{2-x}O_4$ (where, x=0 to 0.33) or lithium manganese oxide, such as $LiMnO_3$, $LiMn_2O_3$, or $LiMnO_2$; lithium copper oxide ($Li_2CuO_2$); vanadium oxide, such as $LiV_3O_8$, $LiFe_3O_4$, $V_2O_5$, or $Cu_2V_2O_7$; Ni-sited lithium nickel oxide represented by a chemical formula $LiNi_{1-x}M_xO_2$ (where, M=Co, Mn, Al, Cu, Fe, Mg, B, or Ga, and x=0.01 to 0.3); lithium manganese composite oxide represented by a chemical formula $LiMn_{2-x}M_xO_2$ (where, M=Co, Ni, Fe, Cr, Zn, or Ta, and x=0.01 to 0.1) or a chemical formula $Li_2Mn_3MO_8$ (where, M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conducting agent is generally added such that the conducting agent has 1 to 50 weight percent based on the total weight of the compound including the cathode active material. The conducting agent is not particularly restricted so long as the conducting agent has high conductivity while the conducting agent does not induce any chemical change in the battery concerned. For example, graphite, such as S natural graphite or artificial graphite; carbon black, such as carbon black, acetylene black, Ketjen black, channel black, furnace black, lamp black, or thermal black; conductive fiber, such as carbon fiber or metallic fiber; metallic powder, such as carbon fluoride powder, aluminum powder or nickel powder; conductive whisker, such as zinc oxide and potassium titanate; conductive metal oxide, such as titanium oxide; or polyphenylene derivatives may be used as the conducting agent.

The binder is a component assisting in binding between the active material and conductive agent, and in binding with the current collector. The binder is typically added in an amount of 1 to 50 weight % based on the total weight of the compound including the cathode active material. As examples of the binder, there may be used polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the cathode. There is no particular limit to the filler as long as it does not cause chemical changes in the battery concerned, and is made of a fibrous material. As examples of the filler, there may be used olefin polymers, such as polyethylene and polypropylene; and fibrous materials, such as glass fiber and carbon fiber.

On the other hand, the anode is manufactured by applying, drying, and pressing an anode active material to an anode current collector. According to circumstances, the conducting agent, the binder, and the filler, which were previously described, may be selectively added to the anode active material.

Generally, the anode current collector has a thickness of 3 to 500 μm. The anode current collector is not particularly restricted as long as the anode current collector has high conductivity while the anode current collector does not induce any chemical change in the battery concerned. For example, the anode current collector may be made of copper, stainless steel, aluminum, nickel, titanium, or plastic carbon. Alternatively, the anode current collector may be made of copper or stainless steel the surface of which is treated with carbon, nickel, titanium, or silver, or an aluminum-cadmium alloy. Like the cathode current collector, the anode current collector may have micro concavo-convex parts formed at the surface thereof so as to increase the attaching force of the anode active material. The anode current collector may be constructed in various forms, such as a film, a sheet, a foil, a net, a porous body, a foam body, and a non-woven fabric body.

As the anode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; conductive polymer, such as polyacetylene; or a Li—Co—Ni based material.

The electrode assembly according to the present invention may be applied to an electrochemical cell that produces electricity by electrochemical reaction between cathodes and anodes. Representative examples of the electrochemical cell include a super capacitor, an ultra capacity, a secondary battery, a fuel cell, various sensors, an electrolyzer, an electrochemical reactor, etc. Preferably, the electrochemical cell is a secondary battery.

The secondary battery is constructed in a structure in which a chargeable and dischargeable electrode assembly is mounted in a battery case while the electrode assembly is impregnated with an ion-containing electrolyte. In an exemplary example, the secondary battery may be a lithium secondary battery.

In recent years, the lithium secondary battery has attracted considerable attention as a power source for large-sized devices as well as small-sized mobile devices. When the lithium secondary battery according to the present invention is applied to such applications, it is preferred for the lithium secondary battery to have small weight. An example of a method of reducing the weight of the secondary battery is to construct the secondary battery in a structure in which the electrode assembly is mounted in a pouch-shaped case made of an aluminum laminate sheet. The lithium secondary battery is well known in the art to which the present invention pertains, and therefore, a related description thereof will not be given.

Also, when the secondary battery is used as a power source of the middle- or large-sized devices, as previously described, it is preferable for the secondary battery to be constructed in a structure in which the operational performance of the secondary battery is maximally restrained even after the long-term use thereof, the life span of the secondary battery is excellent, and the secondary battery is mass-produced with low costs. In this aspect, the secondary battery including the electrode assembly according to the present invention is preferably used in a middle- or large-sized battery module including the secondary battery as a unit cell.

The middle- or large-sized battery module is constructed in a structure in which a plurality of unit cells are connected in series or series/parallel to one another to provide high power and large capacity. The middle- or large-sized battery module is well known in the art to which the present invention pertains, and therefore, a related description thereof will not be given.

In accordance with one aspect of the present invention, there is provided a method of manufacturing an electrode assembly constructed in a structure in which a plurality of electrochemical cells, formed of full cells having a cathode/separator/anode structure, as basic units, are overlapped, and a separator sheet is disposed between the overlapped electrochemical cells, the method including 1) stacking a long cathode sheet and a long anode sheet, while disposing a separator between the cathode sheet and the anode sheet, and cutting the stack into a predetermined size to manufacture a plurality of full cells, 2) placing a unit electrode, which is a cathode or an anode, at a first stage of a long separator sheet and placing the full cells (the first full cell, the second full cell, the third full cell . . . ) manufactured by step 1) from a second stage at predetermined intervals in the same electrode orientation, and 3) winding the unit electrode with the separator sheet once and folding the separator sheet from the first full cell toward the outside where the neighboring full cells are located such that the respective full cells are overlapped.

According to circumstances, an A-type bi-cell or a C-type bi-cell may be located at the first stage of the separator sheet. In this case, the method may include 1) stacking a long cathode sheet and a long anode sheet, while disposing a separator between the cathode sheet and the anode sheet, and cutting the stack into a predetermined size to manufacture a plurality of full cells, 2) placing an A-type bi-cell or a C-type bi-cell at a first stage of a long separator sheet and placing the full cells (the first full cell, the second full cell, the third full cell . . . ) manufactured by step 1) from a second stage at predetermined intervals in the same electrode orientation, and 3) winding the bi-cell with the separator sheet once and folding the separator sheet from the first full cell toward the outside where the neighboring full cells are located such that the respective full cells are overlapped.

When manufacturing the conventional stack/folding type battery, as previously described, unit cells are sorted according to the type thereof, and electrodes of the unit cells are arranged in alternating orientations at predetermined intervals. As a result, when even any one of the unit cells is omitted or wrongly located due to unexpected errors, during the manufacture of the battery, electrodes having the same polarity face each other at the interfaces between the unit cells, with the result that the performance of the battery is deteriorated.

According to the method of manufacturing the electrode assembly, on the other hand, as will be described below, the full cells are arranged in the same electrode orientation such that the top electrodes of the respective full cells located after the second stage of the separator sheet have a polarity opposite to the bottom electrode of the unit electrode or the bi-cell located at the first stage of the separator sheet. Consequently, it is not necessary to change the electrode orientation of the full cells, which are the unit cells. That is, it is possible to place the full cells on the separator sheet in the same electrode orientation and then wind the full cells, whereby the manufacturing process is simplified, and therefore, the productivity of the battery is improved. Also, as previously described, it is possible to solve the problem in that the performance of the battery is deteriorated due to errors during the manufacture of the battery.

In an exemplary example, the method may further include attaching the unit electrode or the bi-cell and the full cells placed at step 2) to the separator sheet before the winding, thereby easily achieving the winding of the cells on the separator sheet. The attachment may be achieved, preferably, by thermal welding. For example, the lamination may be easily achieved at low glass transition temperature (TG). A solution obtained by dissolving polymer, such as PVDF, HFD, PMMA, PEO, or PMMA, which is electrochemically stable at a potential range of 0 to 5 V in a predetermined solvent is applied to a separator and is then dried to manufacture a separator sheet coated with a coupling agent. Subsequently, the unit electrode and the cells are placed on the separator sheet, and then predetermined pressure and heat are applied to the unit electrode, the cells, and the separator sheet. The coupling agent-coated separator sheet may be used as the separator of each cell. The coupling agent-coated separator sheet may assist to maintain the stack structure of the full cells by its coupling force with respect to the electrodes during the manufacture of the electrode assembly After the full cells are located on the long separator sheet at step 2), the full cells are wound such that the separator sheet is disposed between the overlapped full cells. Consequently, electrodes having opposite polarities face each other at the interfaces between the respective full cells. To this end, the respective full cells are arranged in the same electrode orientation. Specifically, the full cells may be located such that top electrodes of the full cells have a polarity opposite to that of the bottom electrode of the unit cell or the bi-cell located at the first stage of the separator sheet. As a result, the full cells are wound such that the first full cell has a bottom electrode opposite in polarity to a top electrode of the third full cell, the second full cell has a bottom electrode opposite in polarity to a top electrode of the fourth full cell, and the third full cell has a bottom electrode opposite in polarity to a top electrode of the fifth full cell.

In an exemplary example, at step 2), the unit electrode or the bi-cell may be spaced from the end of the separator sheet where the winding starts, or the first full cell may be spaced from the unit electrode or the bi-cell, by at least a distance equivalent to the sum of the width and thickness of the unit electrode, and the second and following full cells are located at intervals equivalent to the sum of the thickness of each full cell and the thickness of the separator sheet increased by winding.

Consequently, the unit electrode or the bi-cell is overlapped with the first full cell while the unit electrode or the bi-cell is surrounded by the separator sheet by one-time winding, and therefore, the separator sheet is disposed between the top electrode of the first full cell and the unit electrode or the top electrode of the bi-cell.

In order to maximally restrain the dendritic growth, as previously described, it is preferable to construct the electrode assembly such that anodes are located at the bottom of an $n^{th}$ cell and the bottom of an $n-1^{th}$ cell, forming the outer surface of the electrode assembly, i.e., the top surface and the bottom surface of the electrode assembly.

In an exemplary example, a unit cell ($n^{th}$ cell) located at the last stage of the separator sheet and an $n-1^{th}$ cell adjacent to the $n^{th}$ cell may be constructed such that bottom electrodes of the $n^{th}$ and $n-1^{th}$ cells become anodes. Specifically, when a cathode or an A-type bi-cell is located at the first stage of the separator sheet, the $n^{th}$ and $n-1^{th}$ cells may be C-type bi-cells.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a typical view illustrating an exemplary C-type bi-cell and an exemplary A-type bi-cell, which may be used as a bi-cell in an electrode assembly according to the present invention;

FIG. 4 is a typical view illustrating the structure of an electrode assembly according to a first embodiment of the present invention;

DETAILED DESCRIPTION OF PREFERRED EMBODIMENTS

Now, exemplary embodiments of the present invention will be described in detail with reference to the accompanying drawings. It should be noted, however, that the scope of the present invention is not limited by the illustrated embodiments.

Figure 1:
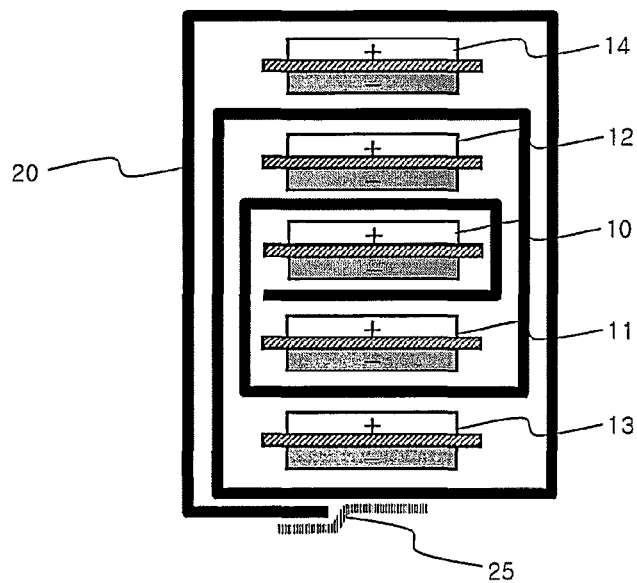
FIG. 1 is a typical view illustrating an exemplary structure of a conventional stack/folding type electrode assembly.
Figure 2:
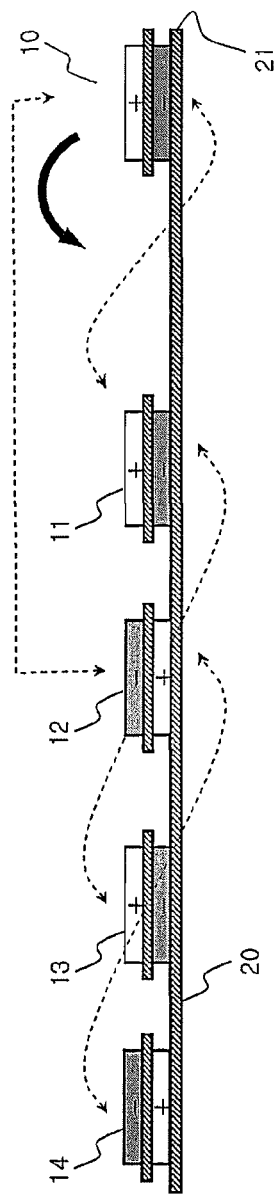
FIG. 2 is a typical view illustrating an exemplary array combination of unit cells in a process for manufacturing the stack/folding type electrode assembly of FIG. 1.
Figure 5:
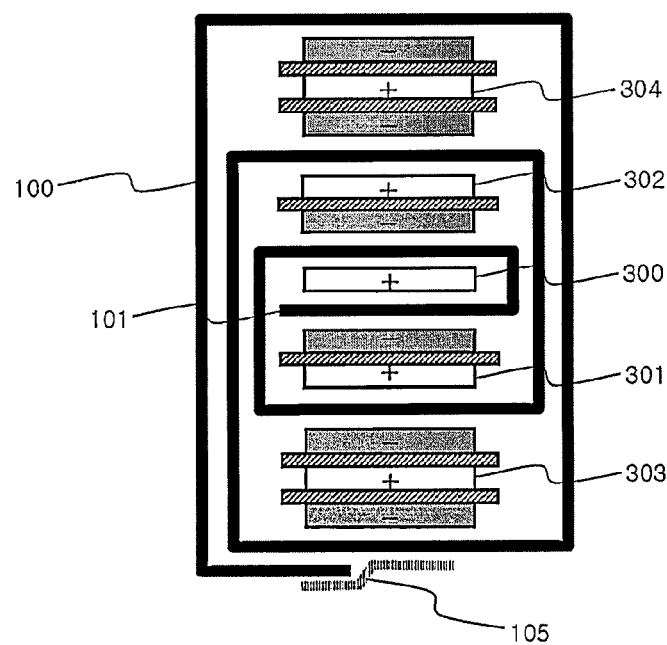
FIG. 5 is a typical view illustrating the structure of an electrode assembly according to a second embodiment of the present invention.

FIGS. 4 and 5 are typical views illustrating the structures of electrode assemblies according to exemplary embodiments of the present invention.

Referring to these drawings, a unit electrode 200; 300 or a bi-cell (not shown), surrounded by a separator sheet 100, may be located at the middle of overlapped full cells, which is a winding start point 101, and the full cells, as unit cells, are disposed above and below the unit electrode 200; 300 or the bi-cell in a symmetrical structure. The end of the separator sheet 100 may be finished, for example, by thermal welding or an adhesive tape 105.

First, FIG. 4 illustrates the structure of an electrode assembly according to a first embodiment of the present invention in which an anode 200 is located at the middle of the electrode assembly, which is a winding start point 101. Full cells 202 and 204 above the anode 200 and full cells 201 and 203 below the anode 200 are arranged in a symmetrical structure.

Next, FIG. 5 illustrates the structure of an electrode assembly according to a second embodiment of the present invention in which a cathode 300 is located at the middle of the electrode assembly, which is a winding start point 101. As in FIG. 4, full cells 302 and 304 above the cathode 300 and full cells 301 and 303 below the cathode 300 are arranged in a symmetrical structure. The bottommost cell 303 and the topmost cell 304, which form the outer surface of the electrode assembly, may be full cells (not shown) which are arranged in a symmetrical structure. Alternatively, the bottommost cell 303 and the topmost cell 304 may be formed of A-type bi-cells in which anodes occupy a large area to maximally restrain the dendritic growth at the anodes.

Figure 6:
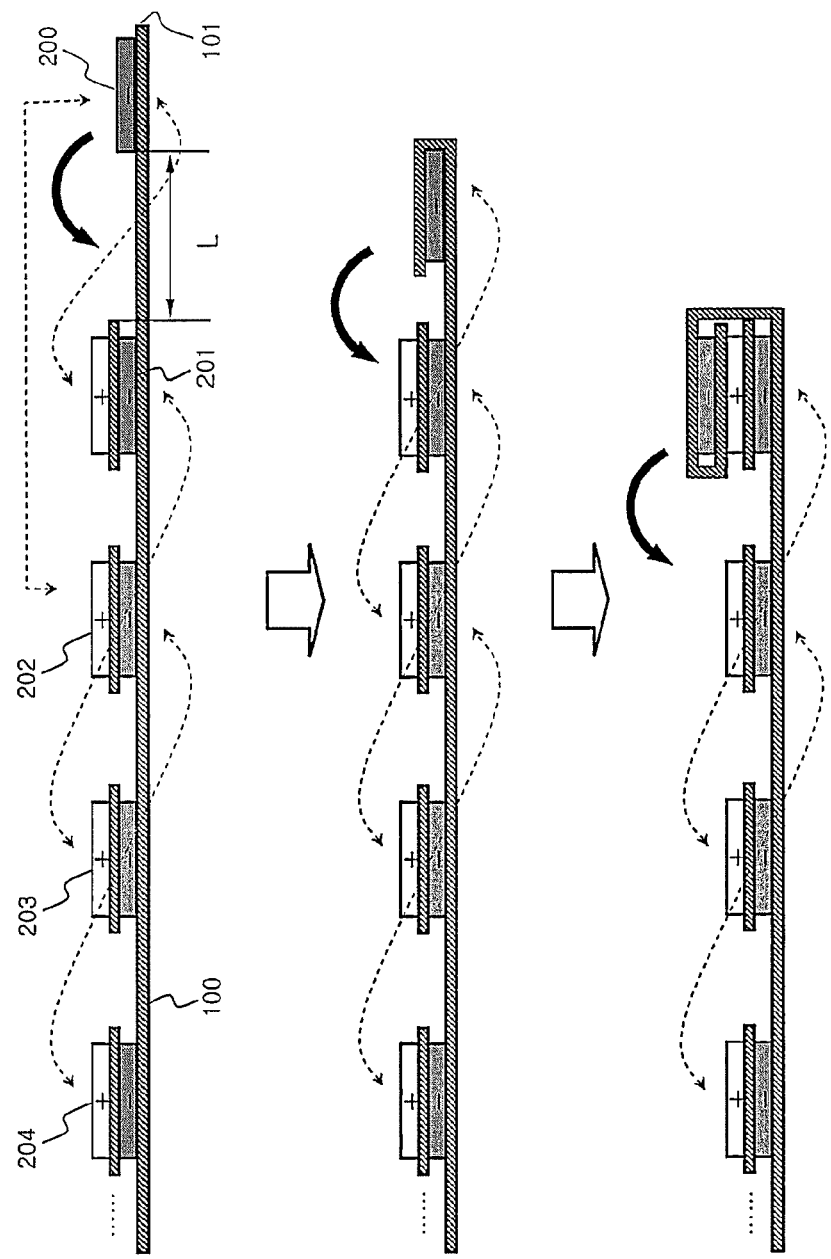
FIG. 6 is a typical view illustrating a process for manufacturing the electrode assembly of FIG. 4 in accordance with an embodiment of the present invention.
Figure 7:
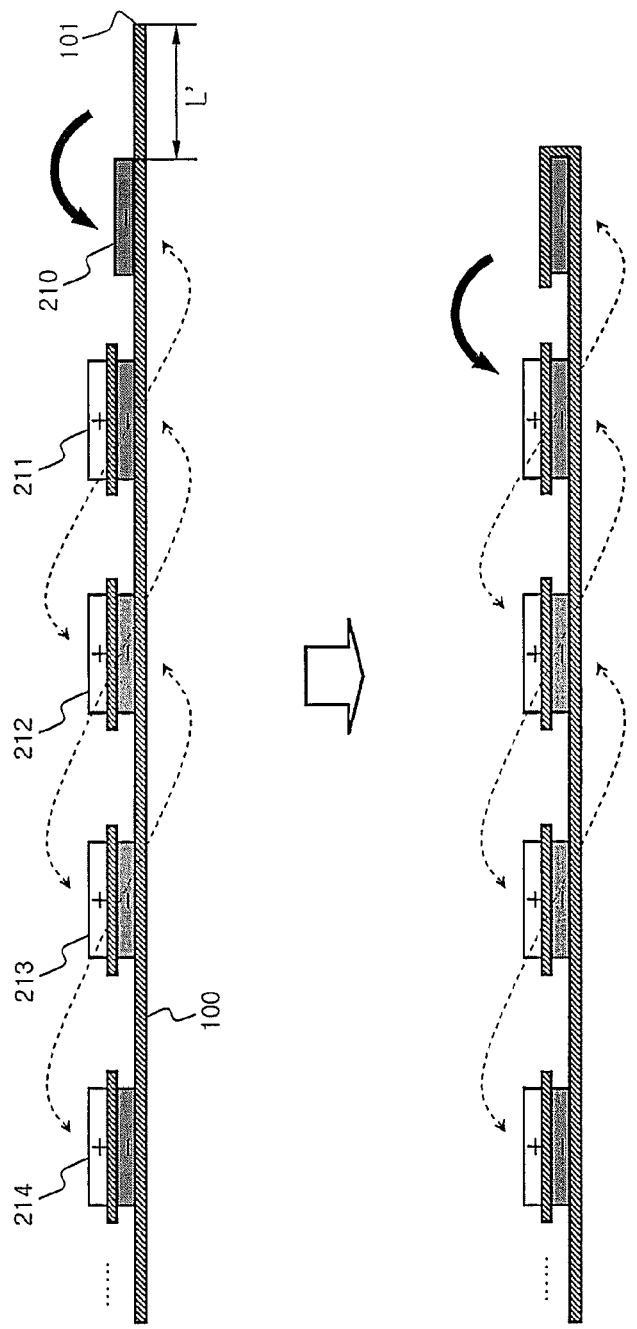
FIG. 7 is a typical view illustrating a process for manufacturing the electrode assembly of FIG. 4 in accordance with another embodiment of the present invention.
Figure 8:
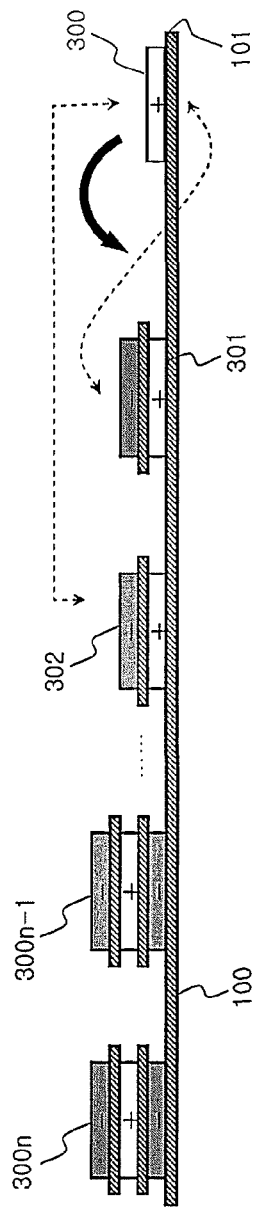
FIG. 8 is a typical view illustrating a process for manufacturing the electrode assembly of FIG. 5 in accordance with a further embodiment of the present invention.

FIGS. 6 to 8 are typical views illustrating processes for manufacturing electrode assemblies using unit electrodes and full cells in accordance with various embodiments of the present invention, respectively.

Referring to these drawings, a separator sheet 100 is a long sheet-type film constructed in a porous structure like the separator of each full cell. The separator sheet 100 has a length sufficient to wind the electrode assembly once more after winding. In the longitudinal direction of the separator sheet 100, a unit electrode or a bi-cell is located at a first stage of the separator sheet 100, and full cells are arranged from a second stage of the separator 100.

First, FIG. 6 typically illustrates a process for manufacturing the electrode assembly of FIG. 4. When carefully observing the array of a unit electrode 200 and full cells 201, 202, 203, 204 . . . , the unit electrode 200 is arranged at one end 101 of the separator sheet 100, where the folding starts. Subsequently, the first full cell 201 is arranged at a position where the first full cell 201 is spaced from the unit electrode 200 by a length L equivalent to the sum of the width and thickness of the unit electrode 200. During the winding, the spacing region L between the unit electrode 200 and the first full cell 201 faces a top electrode of the first full cell 201 after the outer surface of the unit electrode 200 is completely surrounded by the separator sheet 100 by one-time winding. By the winding, the bottom of the unit electrode 200 is located at the top of the first full cell 201 while the separator sheet 100 is disposed between the unit electrode 200 and the first full cell 201, and the top of the unit electrode 200 faces the top electrode (cathode) of the second full cell 202.

Referring to FIG. 7, which illustrates another example of manufacturing the electrode assembly of FIG. 4, a unit electrode 210 is arranged at a position where the unit electrode 210 is spaced from one end 101 of the separator sheet 100, where the folding starts, by a length L' equivalent to the sum of the width and thickness of the unit electrode 210. The spacing region L' between the end 101 of the separator sheet 100 and the unit electrode 210 faces a top electrode of the first full cell 211 after the outer surface of the unit electrode 210 is completely surrounded by the separator sheet 100 by one-time winding. That is, the spacing regions L and L', for maintaining the electrical spacing between the unit electrodes 200 and 210 and the full cells, may be located before or after the unit electrodes 200 and 210

Referring back to FIG. 6, the first and following full cells 201, 202, 203, 204 . . . are sequentially arranged such that the full cells 201, 202, 203, 204 . . . are spaced by a length equivalent to the sum of the thickness of each full cell and the thickness of the separator sheet 100 increased by winding. That is, the surrounding length of the separator sheet 100 increases, during the sequential stacking by the winding. Consequently, the full cells 201, 202, 203, 204 . . . are arranged such that the distance between the full cells 201, 202, 203, 204 . . . gradually increases in the winding direction.

During the winding of the full cells, it is required for cathodes of the full cells to face anodes of the corresponding full cells at the interfaces between the respective full cells. Specifically, the bottom electrode (anode) of the first full cell 201 faces the top electrode (cathode) of the third full cell 203, and the bottom electrode (anode) of the second full cell 202 faces the top electrode (cathode) of the fourth full cell 204, which is repeatedly carried out. Consequently, when the unit electrode 200 is an anode, the respective full cells 201, 202, 203, 204 . . . are arranged such that their anodes are located at the bottoms of the respective full cells 201, 202, 203, 204 . . . .

When arranging the unit electrode 200 and the full cells 201, 202, 203, 204 . . . on the separator sheet, the unit electrode 200 and the full cells 201, 202, 203, 204 . . . may be attached to the top of the separator sheet for easy winding. The attachment may be achieved, preferably, by thermal welding.

Referring to FIG. 8, on the other hand, the unit electrode 300 is a cathode, the respective full cells 301, 302 . . . are arranged such that their cathodes are located at the bottoms of the respective full cells 301, 302 . . . . At this time, the bottom electrode of the last cell 300n and the bottom electrode of a cell 300n-1 adjacent to the last cell 300n form the outer surface of the electrode assembly. Therefore, A-type bi-cells, instead of the full cells, may be arranged at the last position and a position adjacent to the last position of the separator sheet 10 such that the bottom electrode of the last cell 300n and the bottom electrode of the adjacent cell 300n-1 become anodes.

Figure 9:
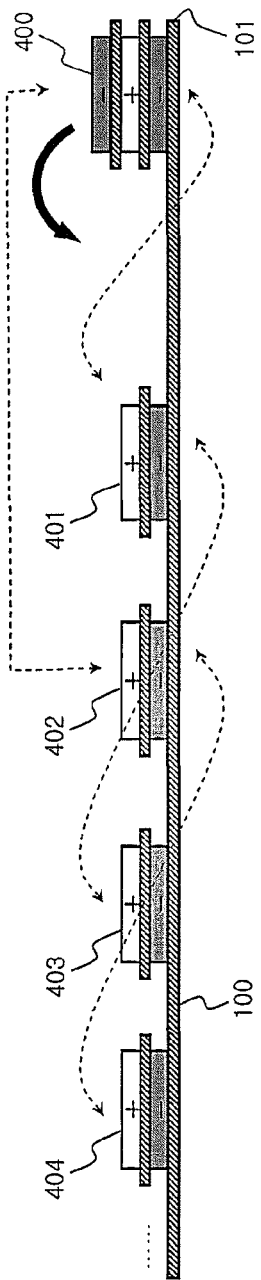
FIG. 9 is a typical view illustrating a process for manufacturing an electrode assembly according to a third embodiment of the present invention.
Figure 10:
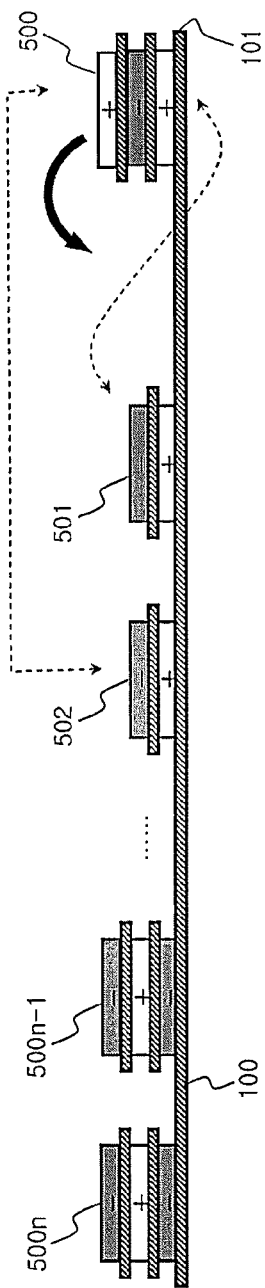
FIG. 10 is a typical view illustrating a process for manufacturing an electrode assembly according to a fourth embodiment of the present invention.

FIGS. 9 and 10 are typical views illustrating processes for manufacturing electrode assemblies using bi-cells and full cells in accordance with third and fourth embodiments of the present invention, respectively.

Referring to these drawings, a bi-cell 400; 500 is arranged at one end 101 of the separator sheet 100, where the folding starts. Subsequently, a first full cell 401; 501 is arranged at a position where the first full cell 401; 501 is spaced from the bi-cell 400; 500 by a length L equivalent to the sum of the width and thickness of the bi-cell 400; 500. During the winding, the spacing region L between the bi-cell 400; 500 and the first full cell 401; 501 faces a top electrode of the first full cell 401; 501 after the outer surface of the bi-cell 400; 500 is completely surrounded by the separator sheet 100 by one-time winding. Full cells following the first full cell are sequentially stacked without spacing corresponding to the width of each full cell. When the A-type bi-cell 400 is located at the first stage of the separator sheet 100, the respective full cells 401, 402, 403, 404 . . . are arranged such that their anodes are located at the bottoms of the respective full cells 401, 402, 403, 404 . . . . On the other hand, when the C-type bi-cell 500 is located at the first stage of the separator sheet 100, the respective full cells 501, 502 . . . are arranged such that their cathodes are located at the bottoms of the respective full cells 501, 502 . . . . In this case, A-type bi-cells 500n and 500n–1, instead of the full cells, may be arranged at the last position and a position adjacent to the last position of the separator sheet 10.

According to the present invention, as shown in FIGS. 6 to 9, the winding is carried out, while the full cells, as basic units, are located on the separator sheet such that the electrodes of the respective full cells are directed in the same direction, whereby the manufacturing process is simplified, and therefore, the productivity of the battery is improved.

Industrial Applicability

As apparent from the above description, the electrode assembly according to the present invention is manufactured with high productivity while the electrode assembly exhibits performance and safety equal to those of the conventional stack/folding type electrode assembly. Furthermore, the electrode assembly according to the present invention exhibits excellent operational performance and safety even after the long-term use thereof.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrode assembly constructed in a structure in which a plurality of electrochemical cells, formed of full cells having a cathode/separator/anode structure, as basic units, are overlapped, and a continuous separator sheet is disposed between the overlapped cells,
    wherein in the structure before the electrochemical cells are overlapped, the full cells are configured to be placed in the same electrode orientation on the continuous separator sheet,
    wherein a unit electrode surrounded by the separator sheet is located at a middle of the overlapped electrochemical cells, which is a winding start point, and the full cells disposed above and below the unit electrode are symmetrical to each other about the unit electrode in the direction of electrodes of the full cells,
    wherein the unit electrode is an anode or cathode, and
    wherein anodes are located at a topmost layer and a bottommost layer of the electrode assembly to form an outer surface of the electrode assembly.

2. An electrode assembly constructed in a structure in which a plurality of electrochemical cells, formed of full cells having a cathode/separator/anode structure, as basic units, are overlapped, and a continuous separator sheet is disposed between the overlapped cells,
    wherein in the structure before the electrochemical cells are overlapped, the full cells are configured to be placed in the same electrode orientation on the continuous separator sheet,
    wherein a bi-cell ('A-type bi-cell'), having a cathode/separator/anode/separator/cathode structure, surrounded by the separator sheet, or ii) a bi-cell ('C-type bi-cell'), having an anode/separator/cathode/separator/anode structure, surrounded by the separator sheet, is located at a middle of the overlapped electrochemical cells, which is a winding start point, and the full cells disposed above and below the bi-cell are symmetrical to each other about the bi-cell in the direction of electrodes of the full cells,
    wherein the bi-cell has a different structure than the full cells, and
    wherein anodes are located at a topmost layer and a bottommost layer of the electrode assembly to form an outer surface of the electrode assembly.

3. The electrode assembly according to claim 1, wherein the separator sheet has unit lengths sufficient to surround the respective electrochemical cells, and the separator sheet is bent inward every unit length to successively surround the unit electrode or the central bi-cell and the full cells from the central unit electrode or the central bi-cell to the outermost full cell.

4. The electrode assembly according to claim 1, wherein the full cells have i) a cathode/separator/anode structure or ii) a cathode/separator/anode/separator/cathode/separator/anode structure.

5. The electrode assembly according to claim 1, wherein the unit electrode or the bi-cell located at the middle of the overlapped electrochemical cells, which is the winding start point, is an anode or a C-type bi-cell.

6. The electrode assembly according to claim 1, wherein, when a cathode or an A-type bi-cell is located at the middle of the overlapped electrochemical cells, which is the winding start point, C-type bi-cells are located at the topmost layer and the bottommost layer of the electrode assembly.

7. The electrode assembly according to claim 1, wherein the outermost end of the separator sheet is fixed by thermal welding or a tape.

8. The electrode assembly according to claim 1, wherein the separator or the separator sheet is made of one selected a group consisting of micro porous polyethylene film, polypropylene film, multi-layered film manufactured by a combination of the polyethylene film and the polypropylene film, and polymer film for a polymer electrolyte, such as polyvinylidene fluoride, polyethylene oxide, polyacrylonitrile, and polyvinylidene fluoride hexafluoropropylene copolymer.

9. The electrode assembly according to claim 1, wherein the cathode is an electrode manufactured by coating opposite major surfaces of a cathode current collector with a cathode material, and the anode is an electrode manufactured by coating opposite major surfaces of an anode current collector with an anode material.

10. A secondary battery comprising the electrode assembly according to claim 1.

11. The secondary battery according to claim 10, wherein the secondary battery is a lithium secondary battery.

12. A middle- or large-sized battery module comprising the secondary battery according to claim 11 as a unit cell.

* * * * *